United States Patent [19]

Graham

[11] 4,243,868
[45] Jan. 6, 1981

[54] ORBITAL ARC-WELDING APPARATUS OF SPLIT CONSTRUCTION

[75] Inventor: Weldon C. Graham, San Diego, Calif.

[73] Assignee: General Atomic Company, San Diego, Calif.

[21] Appl. No.: 35,226

[22] Filed: May 2, 1979

[51] Int. Cl.³ .......................... B23K 9/02; B23K 9/12
[52] U.S. Cl. .......................... 219/125.11; 219/60 A; 219/60.2; 228/29; 266/56
[58] Field of Search .................. 219/59.1, 60 R, 60 A, 219/60.2, 125.11; 228/29; 266/54, 56

[56] References Cited

U.S. PATENT DOCUMENTS

| | | | |
|---|---|---|---|
| 2,930,883 | 3/1960 | Adamec et al. | 219/125.11 X |
| 3,612,502 | 10/1971 | Vasiliev et al. | 266/54 |
| 3,723,702 | 3/1973 | Clay | 219/60.2 |
| 3,835,541 | 9/1974 | Whitworth | 266/54 X |
| 3,946,191 | 3/1976 | Graham | 219/60.2 |
| 4,104,499 | 8/1978 | Luttrell et al. | 219/125.11 X |

FOREIGN PATENT DOCUMENTS

| | | | |
|---|---|---|---|
| 51-35179 | 9/1976 | Japan | 219/125.11 |
| 52-07346 | 1/1977 | Japan | 228/29 |
| 184374 | 9/1966 | U.S.S.R. | 219/59.1 |

Primary Examiner—B. A. Reynolds
Assistant Examiner—Keith E. George
Attorney, Agent, or Firm—Fitch, Even, Tabin, Flannery & Welsh

[57] ABSTRACT

Gas-shielded, arc welding apparatus for securing a tube to the sidewall of a pipe or the like and facilitating removal of the welding apparatus after completion of the weld includes a locating fixture adapted for clamping engagement with the pipe and for positioning a welding head with rotary guide means coaxially aligned with the tube, a welding torch assembly being supported for rotation upon the guide means and supplied with power during rotation for welding the tube to the pipe.

8 Claims, 4 Drawing Figures

ORBITAL ARC-WELDING APPARATUS OF SPLIT CONSTRUCTION

The present invention relates to welding apparatus for securing tubes to the sidewall of a pipe or the like and more specifically to orbital gas tungsten arc-welding (GTAW) apparatus which is of split construction to facilitate removal of the welding apparatus after completion of the weld.

In constructing piping assemblies such as steam generators, condensors, heat exchangers and similar types of devices, it is commonly necessary to join a relatively small diameter tube to the sidewall of a larger pipe or the like. Typically, the tube is secured to the sidewall of the pipe or other body with its end flush or approximately flush with a surface portion of the pipe. The tube may then be welded to the pipe by means of a planar weld extending around the end of the tube and a circumferential portion of the pipe sidewall surrounding the hole with which the tube is to be in communication.

Accordingly, it is common practice to form a hole in the sidewall of the pipe, a series of sized expansion plugs then being pulled through the hole in order to draw and shape a boss forming a planar surface around the sidewall hole in the pipe. A tube having a size suitable for mating with the planar surface of the boss may then be readily welded to the sidewall of the pipe.

In such application, it is frequently necessary to form the attached tube into a relatively complex shape in order to meet particular design requirements. It is also usually advantageous, for purposes of dimensional control and/or economics, to perform any required bends in the tube prior to welding it to the main pipe or other body. With the tube being preformed prior to welding, there is often very limited access for welding apparatus to perform the attachment weld. Accordingly, there has been found a need for welding apparatus capable of readily welding tubes to the sidewalls of larger pipes or the like while facilitating subsequent removal of the welding apparatus after the weld is completed. The apparatus would of course be desirably operable under limited access conditions and could preferably be adapted to automatically position and complete the weld at the end of the tube. In addition, the apparatus may also desirably include means for adding filler material during formation of the weld and may be particularly adapted for securing a tube to the sidewall of a larger pipe. However, such apparatus could also be readily employed for similarly securing such a tube to the sidewall of other hollow bodies.

SUMMARY OF THE INVENTION

It is therefore an object of the invention to provide rotary or orbital welding apparatus capable of overcoming one or more problems referred to above.

More specifically, it is an object of the invention to provide oribital welding apparatus adapted for operation under limited access conditions to secure a tube to the sidewall of a pipe or the like while facilitating removal of the welding apparatus after completion of the weld.

As was noted above, removal of the weld apparatus following completion of the weld is often made difficult because of complex shapes required for the tube or other components of the welded assembly. For this reason, the welding apparatus of the present invention includes a locating fixture secured to a portion of the weld assembly, preferably the pipe to which the tube is to be joined. An orbital welding head is then positioned by the locating fixture in coaxial alignment with the tube, the welding head being of split construction particularly to facilitate its removal from about the tube after the tube is welded to the sidewall of the pipe.

As will be described in greater detail below, the present welding apparatus also contemplates the use of a gas-shielded arc welding torch, the orbital welding head including means for supplying electrical power and inert shielding gas to the torch during rotary operation.

Additional objects and advantages of the invention are made apparent in the following description having reference to the accompanying drawings.

DESCRIPTION OF THE PREFERRED EMBODIMENT

Figure 1:
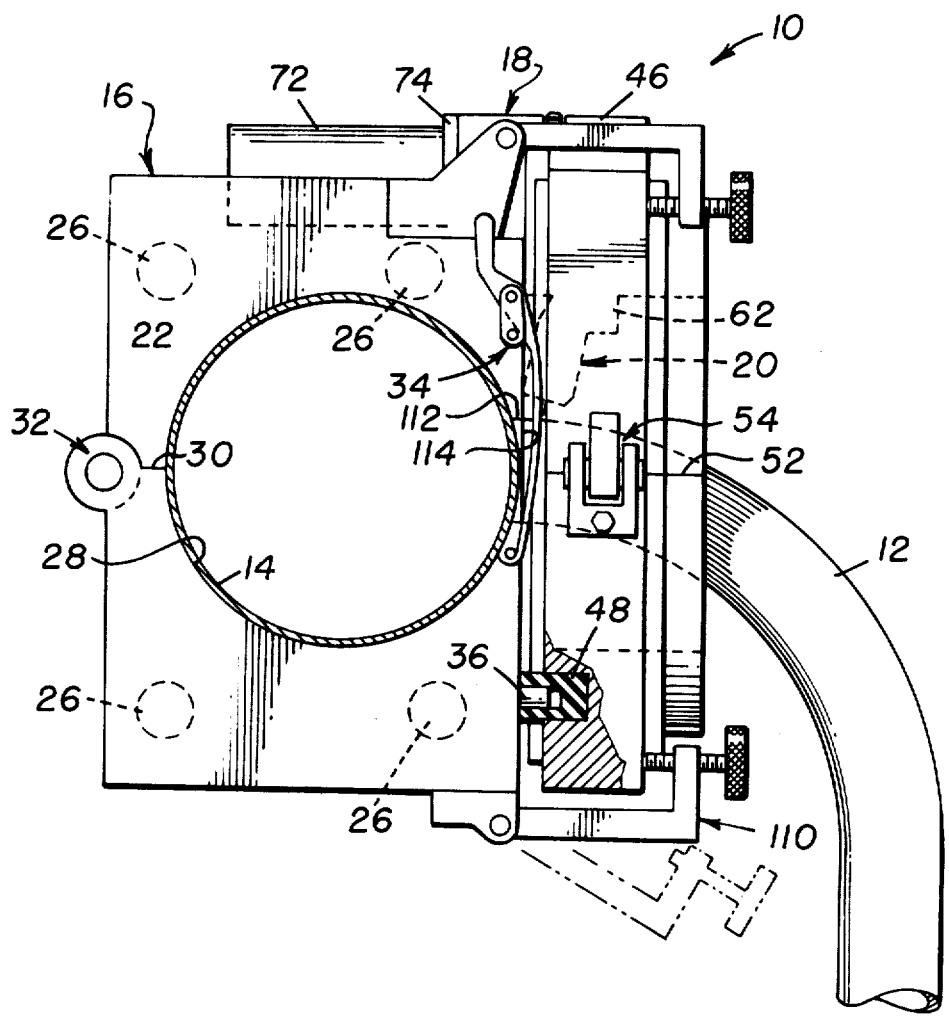
FIG. 1 is a side view of the locating fixture and welding apparatus of the present invention illustrated in position for welding a tube to the sidewall of a pipe, portions of the locating fixture and welding apparatus being broken away and illustrated in section to better illustrate the construction of the welding apparatus.

Very briefly, the present invention relates to welding apparatus generally indicated at 10 for securing one end of a tube 12 to the sidewall of a pipe 14 or the like. As may be best seen in FIG. 1, the tube may be bent or of relatively complex shape limiting access about the interface between the tube and the pipe and making it difficult to effectively complete a weld therebetween. In addition, because of the complex shape of the tube, it is often difficult to disassemble the welding apparatus from the completed weld assembly. For these reasons, the welding apparatus 10 includes a locating fixture 16 designed to facilitate its clamping engagement with a portion of the weld assembly, preferably the pipe 14. A welding head 18 is then secured to the locating fixture in order to provide orbital guide means in coaxial alignment with the tube for supporting a welding torch assembly 20 for movement around the circumferential interface between the tube and pipe in order to effect a weld therebetween. To facilitate assembly of these components prior to the weld and for removing them after the weld, the locating fixture 16 is preferably of split construction which permits its clamping engagement with the pipe 14. Similarly, the welding head 18 is also of split construction in order to particularly facilitate its removal from the tube and pipe assembly after completion of the weld. These features of the invention as well as numerous additional features are described in greater detail below.

Figure 2:
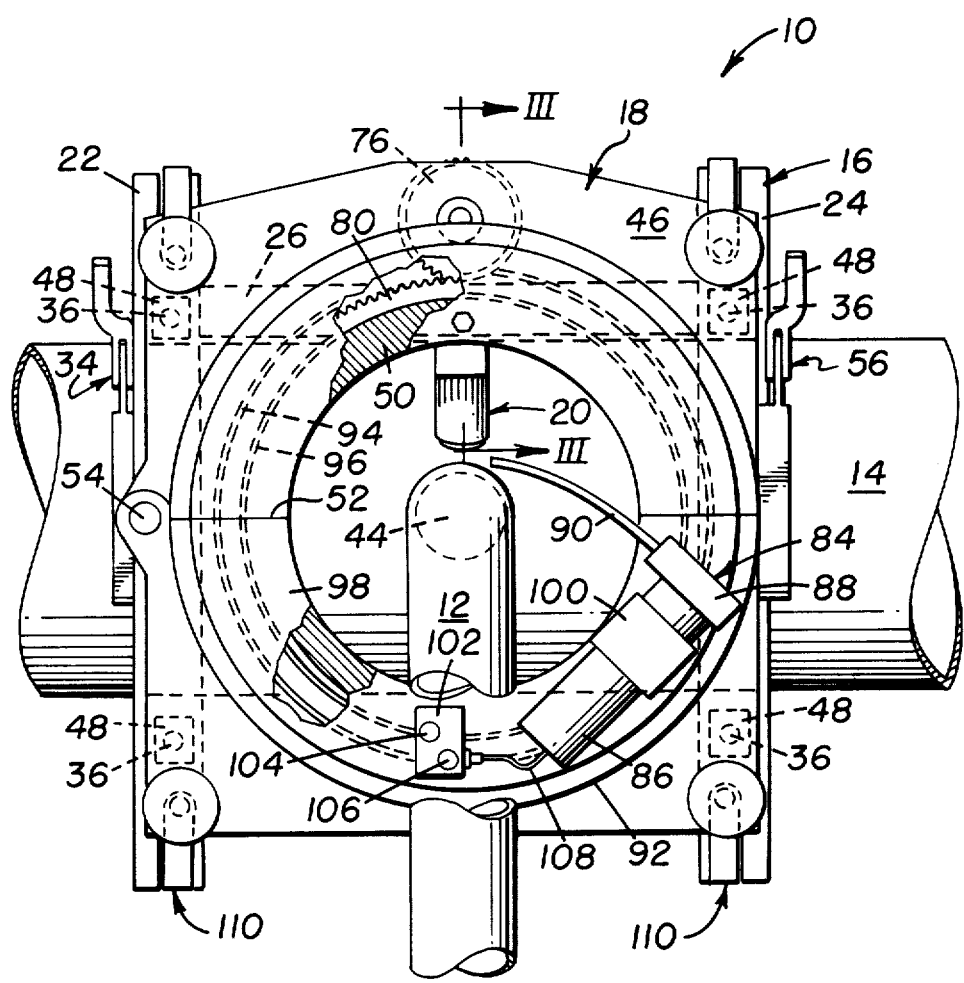
FIG. 2 is a front view of the components illustrated in FIG. 1.

Referring particularly to FIGS. 1 and 2, the locating fixture 16 is fabricated from a pair of side plates 22 and 24 interconnected by means of a plurality of spacer bars 26. Each of the side plates 22 and 24 is formed with a central opening 28 sized to closely conform to the outside diameter of the pipe 14. Each of the side plates 22, 24 is also split at 30 and joined by means of a hinge 32 to permit the locating fixture to be clamped upon the pipe 14. A clamping assembly 34 is provided upon the opposite side of each plate from the hinge 32 in order to secure the split portions together and to firmly clamp them in place upon the pipe 14.

As may be best seen in FIG. 2, the welding head 18 is positioned by the locating fixture 16 for coaxial arrangement about the tube 12. The position of the welding head 18 relative to the tube 12 and pipe 14 is accurately established by means of a plurality of locating pins 36 extending from various portions of the locating fixture 16 as will be described in greater detail below. However, it may be seen from the combination described immediately above that, by precise positioning of the locating fixture 16 upon the pipe 14, the locating pins 36 serve to similarly position the welding head with precision for coaxial alignment with the tube 12.

Figure 4:
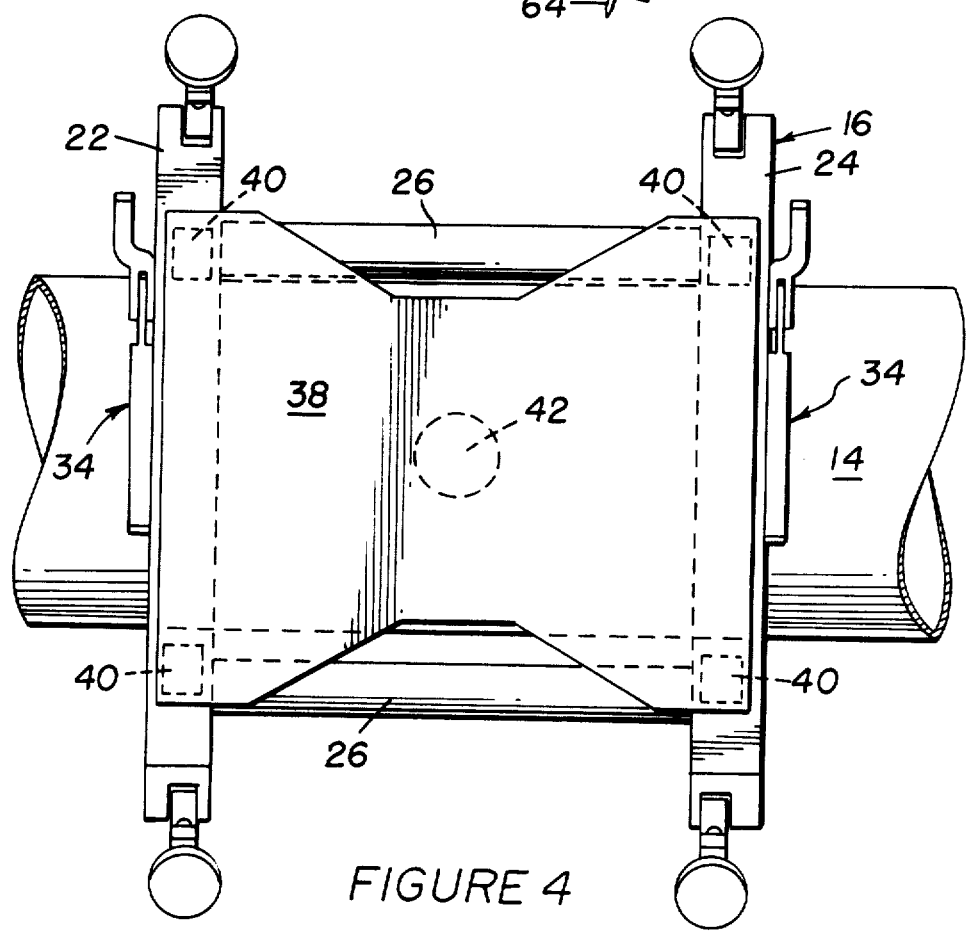
FIG. 4 is a view similar to FIG. 2 with the locating fixture mounted in place upon the pipe and further including a locating plate for positioning the locating fixture in order to coaxially align the orbital welding apparatus with the sidewall hole in the pipe and a tube to be welded to the pipe.

In order to precisely position the locating fixture upon the pipe 14, a locating plate 38 is first installed upon the locating fixture in order to assure proper positioning of the locating fixture before the welding head 18 is mounted thereupon. Referring particularly to FIG. 4, the locating plate 38 is mounted upon the fixture 16 with individual locating blocks 40 being adapted to receive the locating pins 36 on the fixture 16. The locating plate 38 also includes a centrally mounted stud or large pin 42 sized to closely fit within a hole 44 formed in the sidewall of the pipe 14. The stud 42 is mounted upon the locating plate 38 in a position correlating with the coaxial center for the welding head 18. Thus, with the locating plate 38 mounted upon the fixture 16, the stud 42 may be employed to precisely position the locating fixture 16 to assure coaxial alignment of the stud 42 and accordingly the center of the welding head 18 with the hole 44 and accordingly the tube 12. With the locating fixture thus positioned, the clamping assemblies 34 are engaged to firmly secure the locating fixture 16 upon the pipe 14. The locating plate 38 is then removed from the locating fixture and replaced by the welding head 18.

As noted above, the welding head 18 must be precisely positioned by the locating fixture 16 in order to support the welding torch assembly 20 for orbital movement about the tube 12. In addition, the welding head supplies electrical power and inert gas to the welding torch assembly during welding operations.

The welding head 18 is comprised primarily of a stationary main body 46 which is of annular configuration and includes locating blocks 48 similar to the locating blocks 40 on the locating plate 38 for registry with the locating pins 36 on the fixture 16. The welding head 18 also includes an annular rotor 50 which supports the torch assembly 20 and is mounted for rotation upon the main body 46. Both the main body 46, the rotor 50 and other annular components of the welding head 18 are of split construction in order to permit their assembly and disassembly in coaxial relation with the tube 12. Referring particularly to FIG. 2, the main body 46, as well as the other annular components of the welding head 18, is split at 52, the main body also including a hinge assembly 54 and latch mechanism 56 for maintaining the welding head body 46 in its closed configuration. The other components of the welding head are maintained in position by the main body when it is in the closed configuration illustrated in FIG. 2.

The radially inner surface of the main body 46 is stepped to provide an annular projection 58. The rotor 50 is similarly formed with a corresponding annular recess 60 for receiving the projection 58.

A torch holding block 62 is secured to the inner surface of the rotor 50 for supporting the torch assembly 20. The torch assembly 20 is of a conventional gas-shielded, tungsten arc-welding configuration including a tungsten tip 64. During operation, it is necessary to develop an electrical arc between the tungsten tip 64 and the workpiece consisting here of the tube 12 and pipe 14. Inert gas for shielding the arc developed between the tip and workpiece is supplied from a source (not shown) into a passage 66 in the stationary main body 46 which communicates with an annular passage 68 in the rotor 50. The annular passage 68 is in communication with the torch assembly 20 by means of a cross-drilled passage 70 extending through the rotor 50 and torch holding block 62.

Figure 3:
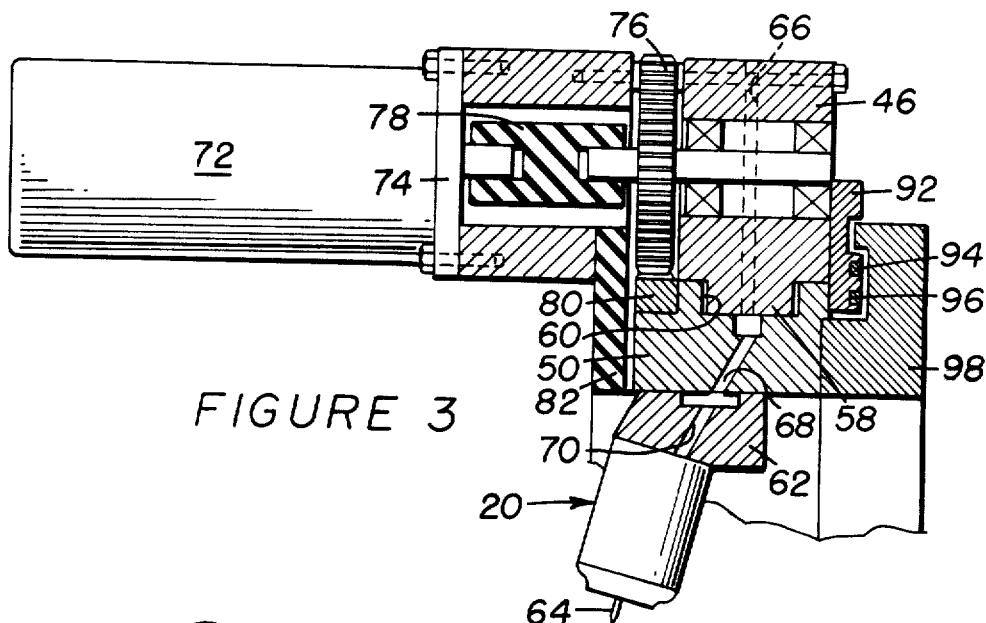
FIG. 3 is an enlarged fragmentary view taken along section line III—III of FIG. 2.

A motor 72 for producing orbital travel of the rotor 50 and torch assembly 20 is supported by a motor housing 74 secured to the main body 46 of the welding head. The housing 74 is formed of insulating material. Referring also to FIG. 3, the motor 72 is coupled with a drive gear 76 by means of an insulating connector 78 which may be formed for example from nylon. The drive gear 76 engages a ring gear 80 which in turn is secured to the rotor 50.

During welding operations, the workpiece including the tube 12 and pipe 14 are at one electrical potential while the torch assembly 20, torch holding block 62, rotor 50 and main body 46 are at another potential. Accordingly, an insulating plate 82 is provided adjacent the drive gear 76 in order to insulate all conductive portions of the welding head 18 from the locating fixture 16 which is necessarily at the same potential as the pipe 14. With the welding head 18 being insulated from the fixture 16 and the drive motor 72, suitable power may be supplied to the motor 72 and to the main body 46 of the welding head for developing the arc welding potential.

In some welding applications, it is also necessary to provide filler material adjacent the tip 64 in order to properly form a weld such as that contemplated between the tube 12 and pipe 14. Wire feed apparatus is generally indicated at 84 in FIG. 1 for this purpose. The wire feed apparatus includes a DC motor 86 connected with a gear box 88 suitably adapted for feeding filler metal wire to the weld area through a guide tube 90. Power for the motor 86 must also be supplied independently from the welding potential developed in the welding head and power supplied to the orbital drive motor 72. An annular insulating plate 92 is secured to the main body 46 opposite the drive gear 76. The insulating plate 92 carries electrical rails 94 and 96 for supplying the power to the wire feed motor 86. Another annular insulating plate 98 is secured to the rotor 50 in overlapping relation with the insulating plate 92 and the electrical rails 94 and 96. The wire feed motor 86 is mounted upon the insulating plate 98 by means of a bracket 100.

A connector assembly 102 is also carried by the annular plate 98 and includes insulated spring-loaded electrical brushes 104 and 106 for respectively engaging the rails 94 and 96. The brushes 104 and 106 are connected with the wire feed motor 86 by means of an electrical lead 108. Thus, separate power for the wire feed motor 86, the orbital drive motor 72 and the welding potential applied to the main body of the ring gear 80 may be supplied from a conventional welding control assembly (not shown).

It is believed that the mode of operation for the present welding apparatus will be obvious from the preceding description. However, operation of the welding apparatus is briefly described below in order to permit a more complete understanding of the invention.

In operation, the locating fixture 16 is positioned upon the pipe 14 by means of the locating plate 38 in precise relation to the hole 44 formed in the sidewall of the pipe 14. The locating fixture 16 is then firmly secured to the pipe 14 by means of the clamping assemblies 34 and the locating plate 38 is replaced by the welding head 18. As noted above, the welding head is precisely positioned by the locating pins 36 upon the fixture 16 so that the center of rotation established by the welding head 18 is exactly coaxial with the hole 44 in the pipe 14 as well as the tube 12. The welding head 18 is maintained in position upon the fixture 16 by means of an additional clamping assembly 110. The clamping assembly 110 is pivotally connected to the locating fixture 16 in order to permit rapid disassembly of the welding head 18 when desired.

Either before or after the welding head 18 is mounted upon the locating fixture 16, the tube 12 is accurately positioned with respect to the pipe 14. For example, the tube 12 may be held in place by an additional fixture (not shown). On the other hand, the tube 12 may also be held in place by tack welding it to the sidewall of the pipe 14 in accurate alignment therewith. Before proceeding further with the method of operation, it is noted again that a boss 112 is formed in the sidewall of the pipe 14 surrounding the hole 44 in order to form a planar surface 114 to which the end of the tube 12 may be welded.

With the tube 12 secured in place relative to the pipe 14 and the welding head 18 mounted upon the locating fixture 16 as shown in FIGS. 1 and 2, suitable power is provided for forming the welding arc at the tip 64, for operating the orbital drive motor 72 and optionally for operating the wire feed motor 86. At the same time, inert gas is supplied to the torch assembly 20 through the series of passages formed in the main body 46, rotor 50 and torch holding block 62. With the welding arc developed between the tip 64 and workpiece which comprises the tube 12 and pipe 14, orbital movement of the torch assembly 20 is produced by the orbital drive motor 72 at a suitable speed for accomplishing a weld at the interface between the planar surface 114 in the sidewall of the pipe 14 and the tube 12. As noted above, filler wire may be supplied during the welding operation if desired by operation of the wire feed motor 86.

After the weld is completed, the electrical power supply and inert gas supply are interrupted, the welding head 18 then being released from the locating fixture 16 by loosening the clamping device 110. The clamp 56 is also released upon the welding head to permit separation of the split components in the welding head so that they may be removed from about the welded tube 12. The clamping assemblies 34 may then also be released to remove the locating fixture 16 from the pipe 14.

Accordingly, welding apparatus has been described above which is particularly adapted for securing a tube to the sidewall of a pipe or the like where limited access is available for the welding apparatus. The welding apparatus has further been described as being particularly adapted to facilitate its removal after completion of the weld. In addition to the variations suggested above for the welding apparatus and its method of operation, additional variations and modifications will also be apparent from the preceding description. Accordingly, the scope of the present invention is defined only by the following appended claims.

What is claimed is:

1. Welding apparatus for welding a tube to a sidewall opening in a larger pipe or the like and facilitating removal of the welding apparatus after completion of the weld, comprising a locating fixture including clamping means for securing the locating fixture to a pipe adjacent the side opening in the pipe, and a welding head adapted for mounting upon the locating fixture to weld a tube to the pipe with the tube being in communication with the interior of the pipe through the sidewall opening, the welding head including orbital guide means of split construction to facilitate its assembly and disassembly in coaxial relation to the tube, means for securing the orbital guide means to the locating fixture in coaxial alignment with the tube, a welding torch assembly mounted upon the orbital guide means and positioned for effecting a weld between the tube and pipe, and means for rotating the welding torch assembly upon the orbital guide means and for operating the welding torch to complete the weld between the tube and pipe.

2. The welding apparatus of claim 1 wherein the welding torch assembly is of a gas-shielded, arc welding type, the orbital guide means including means for supplying electrical power and inert gas to the welding torch assembly as it rotates upon the orbital guide means.

3. The welding apparatus of claim 2 further comprising wire feed means mounted for rotation with the welding torch assembly to supply filler metal at the welding site, the orbital guide means further including means for separately supplying electrical power to a motor for the wire feed means as it rotates with the welding torch assembly.

4. The welding apparatus of claim 1 wherein the locating fixture includes locating means for accurately positioning the welding head and further comprising a locating plate positionable upon the locating fixture in place of the welding head by the locating means, the locating plate including means for precisely positioning the locating fixture with respect to the sidewall opening and the tube in order to assure coaxial alignment of the welding head with the tube.

5. The welding apparatus of claim 4 wherein the locating fixture includes a plurality of positioning pins, the welding head and locating plate each including similarly arranged locating blocks for connection with the respective locating pins on the locating fixture.

6. The welding apparatus of claim 1 wherein the welding head includes an annular main body of split construction and further comprising a rotor of annular construction arranged for rotary movement within the main body, the main body and rotor forming passage means for receiving inert gas in a stationary poriton of the main body and communicating it to the torch assembly as it is carried in orbital travel by the rotor.

7. The welding apparatus of claim 6 wherein the locating fixture is in electrical contact with the pipe and tube and further comprising insulating means arranged intermediate the welding head and locating fixture, the rotor being in electrical contact with the main body and the welding torch assembly in order to facilitate formation of a welding arc between the welding torch assembly and the combination of the tube and pipe.

8. The welding apparatus of claim 7 further comprising wire feed means mounted for rotation with the welding torch assembly to supply filler metal at the welding site, the orbital guide means further including means for separately supplying electrical power to a motor for the wire feed means as it rotates with the welding torch assembly, the rotor carrying an annular insulated body supporting electrical rails for communicating electrical power to the wire feed motor.

* * * * *